United States Patent
Zielinski

(10) Patent No.: US 7,398,701 B2
(45) Date of Patent: Jul. 15, 2008

(54) DEVICE AND METHOD FOR DETERMINING TORQUES ON A TURBINE SHAFT

(75) Inventor: Michael Zielinski, Unterschleissheim (DE)

(73) Assignee: MTU Aero Engines GmbH, Munich (DE)

( * ) Notice: Subject to any disclaimer, the term of this patent is extended or adjusted under 35 U.S.C. 154(b) by 106 days.

(21) Appl. No.: 11/201,947

(22) Filed: Aug. 11, 2005

(65) Prior Publication Data

US 2006/0032319 A1    Feb. 16, 2006

(30) Foreign Application Priority Data

Aug. 13, 2004    (DE) ................. 10 2004 039 314

(51) Int. Cl.
*G01L 1/22* (2006.01)
(52) U.S. Cl. .................... 73/862.324; 73/862.045; 73/862.321; 73/862.325; 73/862.326; 73/862.328
(58) Field of Classification Search ............ 73/862.045, 73/862.321, 862.324, 862.325, 862.326, 73/862.328
See application file for complete search history.

(56) References Cited

U.S. PATENT DOCUMENTS

| | | | | |
|---|---|---|---|---|
| 3,782,184 A | * | 1/1974 | Shuck | ............ 73/764 |
| 4,166,383 A | * | 9/1979 | Lapeyre | ............ 73/862.324 |
| 4,811,238 A | | 3/1989 | Gerrath et al. | ............ 364/508 |
| 5,438,882 A | * | 8/1995 | Karim-Panahi et al. | 73/862.324 |
| 5,557,099 A | * | 9/1996 | Zielinski et al. | ......... 250/227.11 |
| 5,606,137 A | * | 2/1997 | Penketh | ................. 73/862.324 |
| 6,037,581 A | * | 3/2000 | Zorner | ................. 250/231.13 |
| 6,745,621 B1 | * | 6/2004 | Le Roux Cilliers et al. | 73/117.3 |
| 6,795,779 B2 | * | 9/2004 | Delvaux et al. | ............... 702/41 |
| 6,948,381 B1 | * | 9/2005 | Discenzo | ............... 73/862.324 |
| 2004/0049357 A1 | * | 3/2004 | Delvaux et al. | ............... 702/41 |

FOREIGN PATENT DOCUMENTS

EP    1 398 608 A2    3/2004

OTHER PUBLICATIONS

M. Zielinski and G. Ziller, Noncontact vibration measurements on compressor rotor blades, Meas. Sci. Technol. 11 (2000) pp. 847-856, XP-001100401, accepted for publication Jan. 17, 2000.

* cited by examiner

*Primary Examiner*—Edward Lefkowitz
*Assistant Examiner*—Freddie Kirkland, III
(74) *Attorney, Agent, or Firm*—Davidson, Davidson & Kappel, LLC

(57) ABSTRACT

A device is described for determining the torque which is applied to a turbine shaft (10), the determination device having at least one system for contactless measurement of the integral torsion of the turbine shaft (10) and a unit for contactless measurement of the restoring constant of the turbine shaft (10). Furthermore, a method is described for determining the torque which is applied to the low-pressure turbine shaft (10) of a turbine engine, which is distinguished in that, to determine the torque, the integral torsion of the turbine shaft is measured by a contactless method and the restoring constant of the turbine shaft is measured.

8 Claims, 2 Drawing Sheets

DEVICE AND METHOD FOR DETERMINING TORQUES ON A TURBINE SHAFT

Priority is claimed to German Patent Application DE 10 2004 039 314.1, filed Aug. 13, 2004, the entire disclosure of which is incorporated by reference herein.

FIELD OF THE INVENTION

The present invention relates to a device and a method for determining torques on a turbine shaft.

BACKGROUND

Turbines are used, for example, in aircraft engines and as industrial gas turbines. When using turbines, their efficiency is an important characteristic and is therefore determined at a high cost under operating conditions during the development of devices in which the turbines are to be used. For this purpose, the temperatures and pressures at the turbine intake and turbine outlet, which are averaged radially and over the circumference, are primarily measured. The efficiency is inferred from these measurements and from further measured variables via an overall model of the propulsion unit or the gas turbine. Inhomogeneities in the temperature and pressure fields and further effects, some of which are difficult to estimate, typically result in uncertainties of ±2% or more. The power output by the turbine to the compressor via the shaft, which may be measured via the torque applied to the shaft, represents an additional independent variable which may be used to improve the efficiency determination.

In order to significantly improve the efficiency determination, the torque must be determined with a precision of ±0.5% or better. As much as possible, the measurement is to require no modifications or only slight modifications to the shaft and to the engine and/or the gas turbine and is to be performable rapidly and cost-effectively overall.

To determine torques on shafts, typically either the torsion angle is measured over a finite part of the shaft or the torsional strain is measured locally on the shaft surface. In both cases, the torque relates to the measured variable via the shear modulus and the geometry of the shaft.

Different methods have been described in the related art for measuring the torsion angle. In the simplest case, ring gears are attached to both ends of the shaft, which then produce alternating signals, whose relative phase position changes if the shaft is subjected to torsion in non-rotating optical or electrical (e.g., inductive) sensors.

Torsional strains are usually measured using strain gauges or using magnetostrictive metal films, the latter changing their magnetic properties under strain, which may be measured externally by contactless methods using inductive sensors.

However, these types of measurements are extremely complex and usually not sufficiently precise.

In particular, if these methods are used under operating conditions, there is an array of aspects and problems to be considered. First, the shear modulus of the shaft varies from shaft to shaft in a range of up to a few percent. Furthermore, the shear modulus is a function of temperature: typically it changes 0.025%/° C. This is particularly disadvantageous for the measuring methods, since the shaft changes its temperature by several hundred degrees in the operating range of an engine, for example. However, taking this temperature change into consideration is only possible with difficulty, since the temperature distribution along the shaft is complex. Furthermore, the shaft expands at high speeds due to centrifugal force and thus becomes more rigid. In addition, the torsion of the shaft at full load is relatively small and is typically only a few degrees of angle. The shaft may execute complex radial movements and change its axial position in relation to the engine housing in operation. In addition, the blades of the compressor and the turbine bend axially and around the circumference under load. The engine housing and the housing of a gas turbine are also subject to changes during operation. Thus, the housing may bend and twist due to thermal and mechanical loads. Finally, the use of foil strain gauges has the disadvantage that they barely allow precise static measurements at temperatures above 200° C., since both the strain gauges and also the adhesive begin to creep.

Therefore, because of these boundary conditions of engines and gas turbines, precise torque measurements in the engine or on gas turbines is extremely difficult and very complex using the standard methods.

For measurements of local torsion, multiple strain gauges must be attached in order to be able to separate torsional strains from bending strains which occur. Furthermore, thermocouples are required on the shaft for precise temperature measurement. A telemetry system is required for powering the sensors and for signal transmission. The sensor system and the shaft must be calibrated before the measurements, i.e., defined torques and temperatures must be applied during calibration.

For measurements of the torsion angle, the main difficulties are the deformations of the engine housing or the housing of a gas turbine to which the sensors are ultimately attached, and the temperature distributions in the shaft, which may be applied at sufficient precision during calibration only with difficulty.

SUMMARY OF THE INVENTION

One object of the present invention is therefore to be able to provide a precise and cost-effective measurement of the torque applied to the turbine shaft of turbine engines or gas turbines, in particular industrial gas turbines, during operation.

The present invention is based, in part, on the recognition that this object may be achieved optimally through separate measurement of the variables related to the torque. Furthermore, the present invention is based, in part, on the recognition that the restoring forces acting during the torsional oscillation of the shaft correspond to those produced when torques are applied during operation of the gas turbine or during engine operation.

The above-referenced object is achieved by a device for determining the torque which is applied to a turbine shaft, the determination device having at least one system for contactless measuring of the integral torsion of the turbine shaft and a unit for measuring the restoring constant of the turbine shaft.

In accordance with an embodiment of the present invention, a device for determining the torque which is applied to a turbine shaft is provided. The device comprises at least one measuring system and a unit. The measuring system provides contactless measurement of an integral torsion of the turbine shaft, and the unit provides contactless measurement of a restoring constant of the turbine shaft.

In accordance with another embodiment of the present invention, a method for determining the torque which is applied to a turbine shaft is provided comprising the steps of contactlessly measuring an integral torsion of the turbine shaft; and measuring a restoring constant of the turbine shaft.

In accordance with further embodiments of the present invention, a device for determining the torque which is applied to a turbine shaft is provided. The device includes at least one contactless measuring system including at least two alignment elements. At least one of the alignment elements is positioned inside the turbine shaft, and the contactless measuring system is arranged to measure an integral torsion of the turbine shaft. The device further includes a unit for contactless measurement of a restoring constant of the turbine shaft.

Further embodiments of the present invention are set forth below.

In accordance with various embodiments of the present invention described herein, the variables which are necessary for determining the torque may be determined separately and precisely. The torque, which is defined via the following formula:

$$D=k*\phi$$

where D: torque k: restoring constant

φ: integral torsion, may thus be determined precisely. This result may be used in order to be able to precisely determine the turbine efficiency under engine conditions, for example.

The measuring system for determining the integral torsion of the turbine shaft is preferably positioned at least partially within the shaft, through which some of the disadvantages cited in regard to the related art may be avoided. The measuring system may include at least two alignment elements for this purpose, at least one of the alignment elements being positioned inside the shaft. Through this type of measurement, some of the disadvantages which arise in methods of the related art for determining the torsion angle may be avoided. In particular, the deformation of the engine housing or of the gas turbine housing which occurs in operation does not influence the measurement result in this type of measurement. The precision of the measurement result may thus be increased.

Alignment elements as defined in the embodiments of the present invention are elements whose alignment to one another may be checked, in particular registered optically. For this purpose, the shaft is to be laid out so that its interior is externally accessible at least to optical beams from the front side, in a low-pressure turbine shaft from the nose cone, for example, up to the area of the turbine. Therefore, for example, in addition to the hollow design of the turbine shaft, an opening is to be introduced into the nose cone of an engine, for example.

Optical elements, such as disks or annular disks, to which a pattern is at least partially applied or into which a pattern is at least partially introduced, may be used as alignment elements. For example, lines or grids may be used as the pattern. Furthermore, alignment elements may be used which themselves represent the pattern that is necessary for determining their alignment. Thus, for example, grid structures may be used. Furthermore, it is also possible to use tubular alignment elements, these being positioned coaxially to the shaft inside the shaft. These tubes are then, for example, attached to the shaft on one side in the area of the turbine inside the shaft, but are not connected to the shaft over the remainder of their length. Using such a tube, the torsion in the area of the turbine may be brought up to the front side, i.e., to the area of the nose cone, for example. If such a tubular alignment element has a pattern on its front face facing away from the attachment side, this may be seen from the front side of the engine or the gas turbine and the instantaneous position of the turbine area of the shaft may be displayed in the front part of the shaft.

The alignment elements do not have to represent a separate component; rather, a marking provided on at least one location on the shaft which is externally visible may also be used as an alignment element. These markings may be provided around the opening in the nose cone of the engine, for example, and be used to display the position of the compressor area of the shaft in this position.

The measuring system may preferably include two alignment elements, both alignment elements being positioned inside the shaft. Positioning inside the shaft is understood in particular as securing or attaching at least a part of the alignment elements. If both alignment elements are provided inside the shaft, it must be possible to ensure the recognizability and/or detectability of the second alignment element in the turbine area, which is positioned behind the first alignment element in the compressor area. For this purpose, for example, if disks are used as alignment elements, the front disk, which is positioned in the area of the compressor, may be implemented as a transparent disk and, in this case, may preferably be provided with an antireflective coating or may represent an annular disk. The rear disk, which is positioned in the area of the turbine, is preferably implemented as a reflective disk.

The alignment element which is positioned in the area of the turbine inside the shaft is therefore preferably designed to transmit a pattern which it carries, at least into the area of the compressor and up to beyond the nose cone. If disks are used as alignment elements, this transmission is achieved through the cited reflective design of the disk in the area of the turbine, whereby a light beam incident thereon may be deflected. If the alignment element is implemented as a tubular element, the transmission occurs through the length of the tube.

The measuring system for measuring the integral torsion of the shaft preferably includes an image recording device which is designed to record an image of at least a part of the alignment elements. The part of the alignment elements which is imaged is, in particular, the pattern which is carried on the alignment element. In embodiments in which the alignment elements themselves represent the pattern, the entire alignment element is recorded. A camera which is positioned in front of the engine, i.e., in front of the nose cone, may be used as the image recording device. In this position, the camera may register the at least one alignment element provided in the shaft and image it through the opening in the nose cone. In particular, the image recording device is laid out so that it may register both alignment elements. In this way, the relative torsion of the two areas (compressor/turbine) of the shaft may be determined through the relative position of the pattern which the alignment elements carry. In order to be able to register alignment elements which are provided at different areas in the shaft and whose patterns are therefore also at different locations in the shaft, preferably an objective having greater depth of field is used as the objective for the camera, which allows sharp imaging of the patterns of both alignment elements. Alternatively, an objective may be used which has two different focal lengths. In this way, the objective may simultaneously be focused on the alignment elements in different depths in the shaft and their patterns may be imaged sharply.

In order to be able to obtain clear images of the patterns of the alignment elements even with the engine or gas turbine running, a camera which allows extremely short shutter opening times is preferably used.

The image recording device is, according to the present invention, preferably connected to a lighting device which may be synchronized with the image recording device. In this way, simultaneous lighting and imaging of a pattern of one and/or both alignment elements may be ensured.

A flash lamp may be used as the lighting device. In this embodiment, if a camera which allows extremely short shutter opening times is used, the sharp imaging of the patterns of the alignment elements may be achieved alternately through short light flashes and/or through short shutter opening times. The lighting device may preferably be synchronized with the image recording device and may be focused on the alignment elements. A flash lamp having a small lighting head is preferred in particular; optical fibers may be used here. For uniform lighting of alignment elements which are located inside the shaft and typically extend around its entire internal diameter, the lighting head of the flash lamp may be provided centrally on the camera axis.

The image recording device is preferably connected to an image processing unit. In this unit, the images of the alignment elements and/or the patterns provided thereon may be analyzed. Through this analysis, the relative torsion of the patterns to one another when the engine is running may be determined in comparison to a stationary or slowly rotating engine.

The unit for measuring the restoring constant preferably includes a measuring device for measuring the frequency of the torsional oscillation of the turbine shaft. Since the restoring forces acting during the torsional oscillation of the shaft, i.e., the fundamental oscillation, correspond to those produced when a torque is applied, the measurement of the frequency of the torsional oscillation of the shaft may be used to determine the restoring constant for the applied torque. The relationship between the frequency and the restoring forces results from:

$$f = (1/2\pi)\sqrt{(k/\Theta)}$$

where:
- f: torsional frequency
- k: restoring constant
- Θ: moment of inertia

The unit for measuring the restoring constant may be implemented in particular by a reflection sensor, via which the alternating frequency of the blade may be measured from outside the engine at the fan of the engine. The frequency of the torsional oscillation results from the modulation of the alternating frequency of the blade. As an alternative to this sensor system, a sensor may be positioned in the engine housing over a compressor or turbine rotor stage. The frequency of the torsional oscillation of the shaft may also be determined through this measurement.

The unit for measuring the restoring constant preferably includes a unit for calculating the moment of inertia of the shaft, of the compressor, and of the turbine. Alternatively, experimentally established values may be used for the moment of inertia.

The device according to the present invention may, for example, be used for determining the torque on a low-pressure turbine shaft of an aircraft engine. It is advantageous for this purpose if this shaft is easily accessible from the outside for the optical measurements by the device according to the present invention.

A further aspect of the present invention relates to a method for determining the torque which is applied to a turbine shaft, the integral torsion of the turbine shaft being measured without contact to determine the torque, and the restoring constant of the turbine shaft also being measured.

In one embodiment of the method, the frequency of the torsional oscillation is determined using contactless measurement to determine the restoring constant. In a low-pressure turbine shaft of an engine, this may be performed in particular outside the engine at the fan using a reflection sensor. In one embodiment of the method, it includes the method step of computer determination of the moment of inertia of the turbine shaft, the compressor, and the turbine. For this purpose, the known geometries, material densities, and theoretical temperature distributions in the shaft are taken into consideration. However, it is also possible according to the present invention to determine the moments of inertia experimentally at room temperature through weighing and pendulum tests. Additional information for the method for determining the moments of inertia may be obtained by measuring the amplitude of the shaft torsional oscillation at the compressor and at the turbine and/or measuring the ratio of the two amplitudes.

The method according to the present invention is preferably implemented using the device according to the present invention. The features and advantages which have been described in regard to the device according to the present invention, if applicable, apply to the method according to the present invention and vice versa.

BRIEF DESCRIPTION OF THE DRAWINGS

The present invention will be described again in the following on the basis of the attached drawing.

DETAILED DESCRIPTION

In the following, the present invention is essentially described with reference to a low-pressure turbine shaft of an aircraft engine. However, it is obvious to those skilled in the art that the present invention may also be used for other turbine shafts in an aircraft engine or in a gas turbine.

In the figures, only the parts of the device according to the present invention and of the engine which are essential for understanding are indicated. Furthermore, the figures are not drawn to scale.

Figure 1:
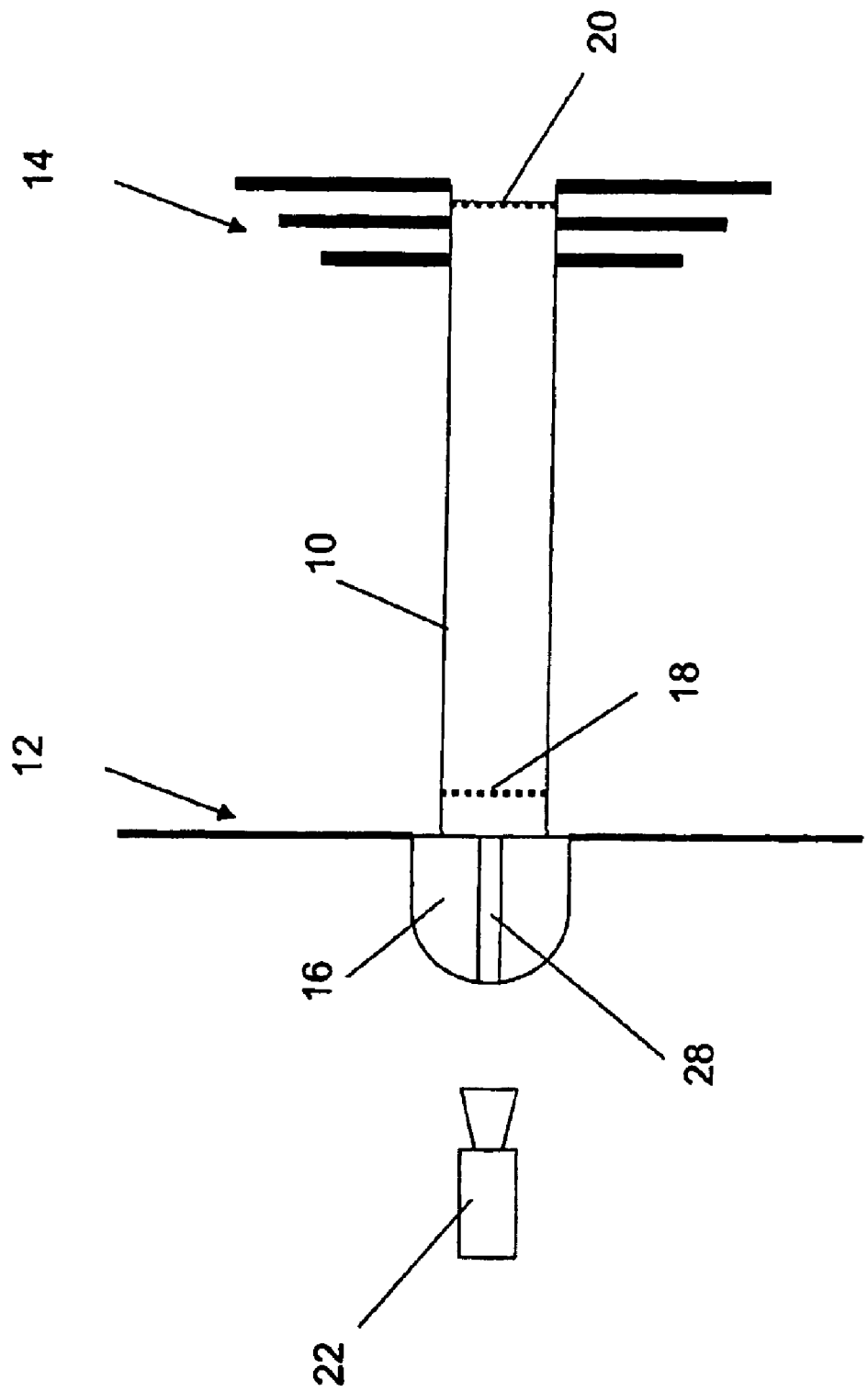
FIG. 1 shows a schematic sectional view of a turbine shaft having an embodiment of the determination device according to the present invention.

A low-pressure turbine shaft 10 having compressor 12 and turbine 14 is schematically illustrated in FIG. 1. Compressor 12 is only indicated by a fan for this purpose. Nose cone 16, which carries the fan blades, is shown at the front end of low-pressure turbine shaft 10.

Only alignment elements 18 and 20, as well as image recording device 22, of the determination device according to the present invention are indicated in FIG. 1. Alignment elements 18, 20 are formed in this embodiment by disks, each of which carries a line structure. Disk 18, positioned in the area of compressor 12, is implemented as a transparent disk for this purpose and disk 20, positioned in the area of turbine 14, is reflective.

In the embodiment shown in FIG. 2, again only alignment elements 24 and 26 and image recording device 22 are shown. In this embodiment, first alignment element 24 is formed by markings on nose cone 16 around opening 28 provided therein, and second alignment element 26 represents a tube which is only connected to shaft 10 in the area of turbine 14 and extends from turbine 14 inside shaft 10 up to the front side of nose cone 16.

The mode of operation of the determination device according to the present invention and the method according to the present invention will now be described with reference to these figures.

Using the determination device according to an embodiment of the present invention, the shear modulus of shaft 10 or, more precisely, the effective restoring constant of shaft 10 between turbine 14 and compressor 12 may be determined under engine conditions by measuring the shaft torsional oscillation. The frequency of this oscillation is a function of the desired restoring constant and of the moments of inertia of compressor 12, turbine 14, and shaft 10. The moments of inertia are in turn a function, via centrifugal force and thermal expansion, of the speed and temperature distribution at the operating point of the engine and may be calculated precisely from the known geometries, material densities, and theoretical temperature distributions. The frequency of the torsional oscillation of the shaft results from the modulation of the blade alternating frequency, which is measured by a contactless method using a reflection sensor at the fan blades of compressor 12.

The integral torsion of shaft 10 is measured in the embodiment shown in FIG. 1, in which a transparent disk 18 is installed in the area of compressor 12 and a light-reflecting disk 20 is installed in the area of turbine 14, via this system. Both alignment elements 18, 20 carry a line structure for this purpose. Images which simultaneously contain the line structure of front and rear disks 18, 20 are recorded through opening 28 in nose cone 16 of the engine using camera 22, which is positioned in front of the engine. The lighting is provided in this case by a flash lamp having short light flashes, so that the images are sharp even when the engine is running.

Figure 2:
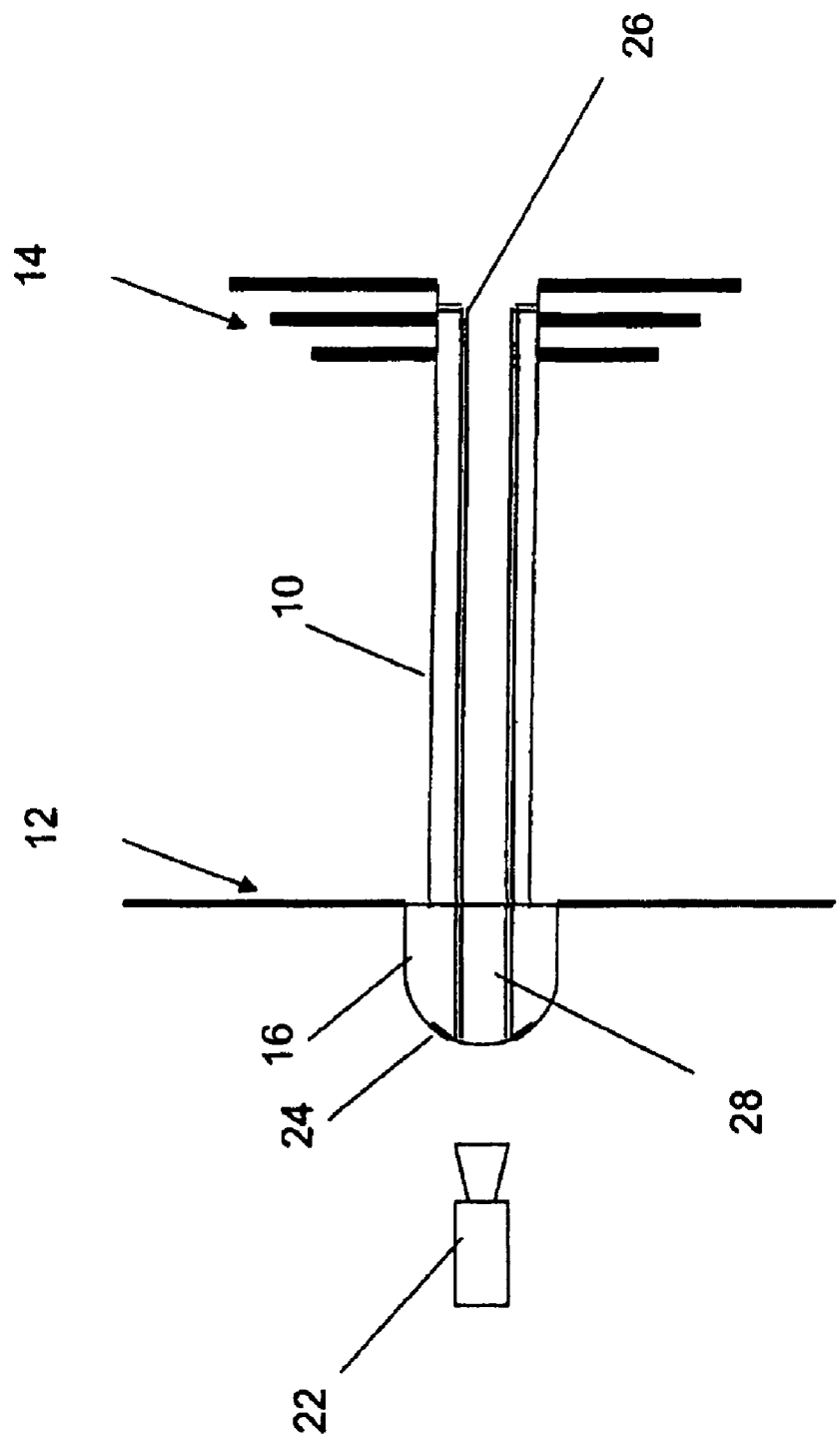
FIG. 2 shows a schematic sectional view of a turbine shaft having a further embodiment of the determination device according to the present invention.

In the embodiment shown in FIG. 2, images are recorded by camera 22, which simultaneously records a marking 24 provided around opening 28 in nose cone 16, such as lines, and the markings, in particular lines, provided on the front face of tube 26, which is used as the alignment element. The lighting is also provided by stroboscopic light for this purpose, i.e., using short light flashes, in order to be able to produce sharp images.

The patterns and/or lines on both alignment elements 18, 20 and/or 24, 26 are selected so that clearly recognizable structures are reproduced in the image recorded by camera 22. For example, a plurality of thin lines is used.

The torsion of the two line structures relative to one another may be determined in comparison to the stationary or slowly rotating engine via appropriate image analysis. By recording many images and averaging the individual results, high precision is achieved in spite of the movement of the engine and the shaft. The pattern which is provided on the alignment elements is selected so that in spite of diffraction effects and a finite pixel count in the image processing, high precision may still be achieved through the image analysis.

The alignment elements do not have to be permanently connected to the shaft. Rather, they may also represent bodies which may be inserted from the front into the shaft using a tool, clamped in the correct position, and removed again after the measurement. In this way, even during inspection runs of mass-produced engines, it is possible to measure the integral torsion and determine the effective restoring constant and the torques, and thus the efficiency of the turbine, more precisely.

The measuring method according to the present invention has the advantage in particular that it does not require separate calibration of the shaft and sensor system. Only minor measures need to be taken on the shaft. Otherwise, the torque applied to the shaft is measured by a contactless method from outside the engine at high precision. The requirement is that the shaft is hollow and may be made optically accessible from the front up to the area of the turbine. The method is therefore applicable precisely, cost-effectively, and rapidly.

What is claimed is:

1. A device for determining the torque which is applied to a turbine shaft, comprising:
   at least one contactless measuring system including at least two alignment elements, at least one of the alignment elements being positioned inside the turbine shaft, the contactless measuring system arranged to measure an integral torsion of the turbine shaft; and
   a unit for contactless measurement of a restoring constant of the turbine shaft,
   wherein one of the alignment elements is positioned inside the turbine shaft in an area of the turbine shaft that is connected to a turbine, and wherein said one of the alignment elements is positioned to transmit a pattern, which is provided thereon, at least into the area of a compressor.

2. The device as recited in claim 1, wherein the at least two alignment elements comprise two alignment elements, both alignment elements being positioned inside the turbine shaft.

3. The device as recited in claim 1, wherein each of the at least two alignment elements carry a pattern or have the form of a pattern.

4. The device as recited in claim 1, wherein the alignment elements are optical elements.

5. The device as recited in claim 1, wherein the measuring system further includes an image recording device, the image recording device positioned to record an image of at least a part of the alignment elements.

6. The device as recited in claim 5, further comprising an image processing unit connected to the image recording device of the measuring system.

7. The device as recited in claim 1, wherein the unit for measuring the restoring constant includes a measuring device for measuring a torsional frequency of a torsional oscillation of the turbine shaft.

8. The device as recited in claim 1, wherein the unit for measuring the restoring constant includes a computer, the computer determining a moment of inertia of the turbine shaft, a compressor, and a turbine.

* * * * *